(12) United States Patent
Claire

(10) Patent No.: US 10,288,253 B2
(45) Date of Patent: May 14, 2019

(54) LIGHT PANEL SHADE

(71) Applicant: JULIE CLAIRE COMPANY LIMITED, Torquay, Devon (GB)

(72) Inventor: Julie Claire, Torquay (GB)

(*) Notice: Subject to any disclaimer, the term of this patent is extended or adjusted under 35 U.S.C. 154(b) by 123 days.

(21) Appl. No.: 15/313,244

(22) PCT Filed: May 22, 2015

(86) PCT No.: PCT/IB2015/053794
§ 371 (c)(1),
(2) Date: Nov. 22, 2016

(87) PCT Pub. No.: WO2015/177771
PCT Pub. Date: Nov. 26, 2015

(65) Prior Publication Data
US 2017/0122522 A1 May 4, 2017

(30) Foreign Application Priority Data

May 23, 2014 (GB) .................................. 1409275.3
Jan. 29, 2015 (GB) .................................. 1501484.8

(51) Int. Cl.
*F21S 8/00* (2006.01)
*F21S 8/02* (2006.01)
(Continued)

(52) U.S. Cl.
CPC .................. *F21V 1/12* (2013.01); *F21S 8/00* (2013.01); *F21S 8/026* (2013.01); *F21S 8/04* (2013.01);
(Continued)

(58) Field of Classification Search
CPC ...... F21V 1/12; F21V 1/00; F21V 1/16; F21V 17/101; F21V 9/00; F21V 2200/20;
(Continued)

(56) References Cited

U.S. PATENT DOCUMENTS 8,950,921 B2 * 2/2015 Sheng ...................... F21S 8/04
362/612
9,664,365 B2 * 5/2017 Myers .................. F21V 23/023
(Continued)

FOREIGN PATENT DOCUMENTS

DE   296 10 818   1/1997
EP   2 187 113   5/2010
(Continued)

OTHER PUBLICATIONS

International Search Report (ISR) dated Aug. 19, 2015 in International (PCT) Application No. PCT/IB2015/053794.

*Primary Examiner* — Joseph L Williams
*Assistant Examiner* — Jose M Diaz
(74) *Attorney, Agent, or Firm* — Andrew Kenny

(57) ABSTRACT

This invention relates generally to a light panel light source shade in the form of a masking tape or sheet. Ideally the masks may be printed directly on a surface design layer for use with the light panel. The invention is for use in the field of decorative 5 lighting. The problem of the alternating bright and dark areas on an illuminated face of a pane of a light panel is that they produce an unpleasant mottled surface brightness around the perimeter or across a face of the pane of a light panel. A light pane light source shade is developed to produce a uniform intensity of light across the face of the light panel.

19 Claims, 13 Drawing Sheets

(51) Int. Cl.

| | | |
|---|---|---|
| *F21S 8/04* | (2006.01) | |
| *F21V 1/00* | (2006.01) | |
| *F21V 1/12* | (2006.01) | |
| *F21V 1/16* | (2018.01) | |
| *F21V 8/00* | (2006.01) | |
| *F21V 9/00* | (2018.01) | |
| *F21V 17/10* | (2006.01) | |
| *G09F 13/18* | (2006.01) | |
| *F21Y 103/10* | (2016.01) | |
| *F21Y 115/10* | (2016.01) | |
| *G02F 1/1335* | (2006.01) | |

(52) U.S. Cl.
CPC ............... *F21V 1/00* (2013.01); *F21V 1/16* (2013.01); *F21V 9/00* (2013.01); *F21V 17/101* (2013.01); *G02B 6/0033* (2013.01); *G02F 1/133603* (2013.01); *G09F 13/18* (2013.01); *F21V 2200/20* (2015.01); *F21Y 2103/10* (2016.08); *F21Y 2115/10* (2016.08)

(58) Field of Classification Search
CPC ........ F21V 7/0016; F21V 7/0025; F21V 7/09; G02F 1/133603; G09F 13/18; F21S 8/00; F21S 8/026; F21S 8/04; G02B 6/0033; F21Y 2103/10; F21Y 2115/10; F21Y 2105/10; F21K 9/68
See application file for complete search history.

(56) References Cited

U.S. PATENT DOCUMENTS

| | | | |
|---|---|---|---|
| 2003/0214717 | A1 | 11/2003 | Kaminsky et al. |
| 2005/0072032 | A1 | 4/2005 | McCollum et al. |
| 2005/0105186 | A1 | 5/2005 | Kaminsky et al. |
| 2006/0268545 | A1 | 11/2006 | McCollum et al. |
| 2008/0062359 | A1 | 3/2008 | Inaba et al. |
| 2009/0207632 | A1 | 8/2009 | McCollum et al. |
| 2010/0124064 | A1 | 5/2010 | Ogawa et al. |
| 2010/0254121 | A1* | 10/2010 | Zhou .................... G02B 6/0043 362/147 |
| 2010/0309685 | A1 | 12/2010 | McCollum et al. |
| 2012/0081924 | A1 | 4/2012 | McCollum et al. |
| 2012/0287631 | A1* | 11/2012 | Sheng ...................... F21S 8/04 362/235 |
| 2012/0320627 | A1* | 12/2012 | Araki ....................... F21S 8/04 362/608 |
| 2013/0038211 | A1* | 2/2013 | Kang ............... G02F 1/133603 315/113 |
| 2013/0051072 | A1 | 2/2013 | Wen et al. |
| 2013/0070455 | A1* | 3/2013 | Tsui ........................ F21S 8/026 362/235 |
| 2013/0314944 | A1 | 11/2013 | McCollum et al. |
| 2014/0313780 | A1* | 10/2014 | Myers ..................... F21V 23/06 362/646 |
| 2015/0003112 | A1 | 1/2015 | McCollum et al. |

FOREIGN PATENT DOCUMENTS

| | | |
|---|---|---|
| GB | 2 283 707 | 5/1995 |
| WO | 2005/001892 | 1/2005 |
| WO | 2010/055339 | 5/2010 |

* cited by examiner

LIGHT PANEL SHADE

FIELD OF THE INVENTION

This invention relates generally to a light panel light source shade in the form of a masking tape. The invention is particularly but not exclusively intended for use in the field of decorative lighting.

BACKGROUND

Light panels that are used for decorative lighting have a light panel that from its face radiates a soft light. The entire face of the panel appears to glow.

In one example a light panel comprises a translucent or transparent pane and several point light sources such as light emitting diodes LEDs. The point light sources are distributed around the perimeter of the pane. They are fixed to the sides of the pane. The light sources radiate light into the pane through the perimeter surface of the pane. Light shines out from the pane through the front face of the pane and the back face of the pane. Etchings in the surface of the panel may be used to transmit the light further. The back face of the pane may be covered with a reflector such as a silvered or white back layer in order to reflect light through the front face of the pane.

An unwanted effect of illuminating a light panel with point light sources that are distributed around the perimeter of the panel is that uneven illumination occurs around the perimeter of the pane where there are sometimes alternating bright 'hot spots' and dark areas. Areas of the face nearest to the point sources glow most brightly. These alternating hotspots and dark areas spoil the even glow of the face of the panel. For example where a wall or ceiling of a room is to be illuminated with a cool glow by a light panel, a consistent, or uniform or non-mottled intensity of the glow across the entire face of the pane is desirable for its appearance.

In another example of a light panel, a translucent or transparent pane has point light sources such as light emitting diodes located in a slot in the face of the pane. The slot is aligned with the perimeter edge of the pane and the diodes shine inwards towards the center of the pane. As in the aforementioned example the light shines out of the pane through the front face of the pane and the back face of the pane and may be transmitted further by etchings. The slot gives rise to a bright strip adjacent the perimeter edge of the pane. The areas of the surface of the pane closest to the diodes in the slot glow most brightly. These disturbances and uneven light intensity from the face of the pane are undesirable.

In another example of a light panel LED lights are distributed evenly across an entire face of the pane and embedded into the pane or over the face of the pane or behind the pane. In this arrangement the entire face of the pane is mottled by bright areas close to the diodes and dark areas between the diodes.

The face of a light panel may be used as a backlight for a thin polymer, canvas or glass sheet or other material/product which is translucent or transparent having pleasant colours and images printed thereon or attached thereto. The sheet is known in the art as a slide or surface design layer. A light panel with a mottled face and uneven areas of brightness can spoil the view of colours and images on the slide resulting in poor visual impact.

PRIOR ART

One prior approach to the problem of uneven lighting has been to cover mottled areas around the perimeter on the face of the pane with an opaque frame. However, such an opaque frame that covers the perimeter area removes a significant percentage of the useful area of the face of the light panel.

A drawback of light panels of the prior art is that they must have a frame to cover the mottled areas along the sides. Otherwise the appearance of the light panel will be spoiled with the look 'hotspots'

An opaque frame therefore decreases the efficiency of the light panel. The area underneath the frame remains illuminated and this requires energy. However the illuminated area of the light panel under the frame is wasted since it cannot be seen.

Another approach has been to replace the point light sources with a long fluorescent light tube arranged along the perimeter of the pane or individual fluorescent tubes spaced at parallel distances behind the pane. A long fluorescent tube shines light into a side of the pane with even intensity along the length of the side. A disadvantage of this approach however, is that fluorescent tubes are fragile and prone to shattering. They also have a much shorter useful lifespan than LED lights. Fluorescent tubes also provide less intense light so the width of the panel is reduced and, if the tubes are arranged at parallel distances behind the pane the light emitted is uneven.

Where the face of a light panel is to be used as a backlight for a translucent or transparent slide or surface design layer having pleasant colours and/or images, the uneven brightness of the pane is most apparent if the slide is pressed against the pane. Another approach therefore has been to suspend the slide at a distance from the surface of the pane with a frame. The frame and the pane form a 'light box'.

The pane of the light box is covered by the slide or surface design layer. About two to six centimeters is of separation between the slide and the pane is usually enough to make the mottled surface of the pane unobservable through the slide. However in areas where the slide is nearly transparent or insufficient space is allowed between the light panel and the slide the bright spots on surface of the pane can still be seen even through the slide or surface design layer even with two to six centimeters of separation.

An advantage of a light panel is the thinness of the pane. The surface of the pane may be fixed very close to a wall or a ceiling surface. An assembly including a light panel in a light box is several times thicker than a light panel alone and takes away this advantage. A light box complicates a light panel and sometimes only adds expense and unwanted thickness.

In US patent application US-A1-20130051072 (Wen and Liu) a thin optical film is revealed. In use the film covers a second surface so as to affect light radiated from a light emitting element into a first light incident surface and thence through the second surface. The thin optical film is such that its thickness affects the colour of light transmitted through it. Consequently the film revealed by Wen and Liu does not act as shade. Rather it acts as a light colour changer.

In US patent application US-A1-200870062359 (Inaba, Yamaguchi, and Ueda) an optical interference filter whose major component is a film member is revealed. The filter separates colors of red, green, and blue and so the filter makes colours on a liquid crystal display, electroluminescence display, and projection display easier to see. So Inaba, Yamaguchi, and Ueda teach away from using a filter to shade light and reduce its visibility.

There is therefore a need for a light panel that benefits from the long life and durability of LED lights and that does not suffer from alternating bright and dark areas visible on the face of the panel. A solution that can be a retrofit to existing panels or be incorporated into current LED light panels at the manufacturing stage is needed.

SUMMARY OF THE INVENTION

According to an aspect of the present invention, there is provided a light panel that has a shade in the form of a film having regions of varying reflectivity and/or opacity so as to define a mask or a plurality of masks each dimensioned and arranged to lie in register with a light source located to shine through a light emitting pane so as to ensure regulated light emission from said panel.

Preferably masks are portions of the regions. Preferably the regions and masks have a preselected and/or reflectivity to regulate the intensity of light transmitted though them.

Preferably the regulated light transmission is a uniform light transmission from said panel. Preferably the regulated light transmission is a uniform transmission from a portion of the pane shaded by the shade.

Preferably each mask is dimensioned and arranged so as to shade a light pattern from point light sources comprised in the light source so that light radiates from said panel with uniform intensity.

Preferably the light panel has a shade in the form of a film demarcated by a plurality of masks, each mask is dimensioned and arranged so as to shade a light pattern corresponding to a point light source arranged to shine through a light emitting pane of the panel so that light radiates from said panel with uniform intensity.

The effect of a region or varying reflectivity and of a mask is to decrease the intensity of light radiating from a pane of the light panel in the areas that are brighter than the overall light intensity across the panel. Thus the face of the pane may have several different areas that each radiate a different intensity. The regions and masks reduce the intensity of the bright areas of the resultant light pattern on the surface of the pane and may adjust the colour or tint that an observer viewing the light panel covered by the shade can see. The observer thus sees a uniform intensity and/or colour and/or tint of light radiated from the light panel.

Preferably the light panel that has a shade in the form of a film having regions of varying reflectivity and/or opacity so as to define masks each dimensioned and arranged to lie in register with a light source located to shine through a light emitting pane so as to ensure uniform light emission from said panel.

Preferably the shade is arranged to transmit uniform light emission from a light panel having alternating bright and dark areas; the shade has the form of a film tape having regions of various preselected opacities spanning the length of the tape, characterised in that the opacity of the regions varies in register with the brightness of the areas.

Light from the bright and dark areas is transmitted through the regions and masks and the preselected opacity of the regions and masks regulates the intensity of the light transmitted.

Preferably there is a slide or surface design layer and a light panel for use as backlight for the slide or surface design layer, wherein the slide or surface design layer comprises a shade of primary masks, the slide or surface design layer is arranged with respect to the light panel such that each mask is arranged so as to shade a light pattern corresponding to a point light source arranged to shine through a light emitting pane of the panel so that light radiates from said panel with uniform intensity.

Preferably the shade has a shape with an edge to conform to an edge of a perimeter of a face of the light emitting pane.

Preferably the shade in the form of a film is laid onto the face of the pane. Aligning the edge of the shade with the edge of the face also locates the masks with respect to the edge. Locating the masks with respect to the edge assists with locating the masks with respect to the point light sources and the corresponding bright and dark areas on the face of the pane.

Preferably the shade is a band or tape. A band has a width that may be adapted to cover the bright and dark areas on the face of the pane. A band that is rectangular has a convenient shape to cover an area near the perimeter of a pane with a straight edge and can be provided in pre-determined length strips. A tape is also easily rolled into a roll which is convenient for storing a long length of the shade. Bands of the shade of a length corresponding to the length of an edge of the pane are easily cut off the roll. Preferably the band is wide enough to be marked with masks that shade bright areas extending from the edge of the face of the pane toward the center of the pane. Preferably the shade has regions or masks of preselected opacity and/or reflectivity that extend from an edge of the shade, such as the lengthwise edge of the the tape or band. Preferably the regions or mask extend form the edge of the shade in register with the bright and dark areas on the pane. The bright and dark areas form a light pattern on the pane.

Preferably portions of the regions extend in discrete patches from a lengthwise edge of the tape. This is advantageous because light sources that shine into a light emitting pane, are arranged at the edge to the pane. The patches extending from a lengthwise edge of the tape are located where they can shade bright areas at the edge of the pane resulting from the light sources shining into the edge. Light from a light source shines into an edge of the pane. The light shines out from the face of a pane visible as a light pattern on the face of the pane. The light shines through the shade and the shade regulates the light transmitted through so that a uniform intensity of light shines through all regions of the shade. An observer looking at the shade covering pane cannot see the light pattern. They can only see the uniform intensity of light transmitted through all areas of the shade.

Preferably the shade is in the form of a tape with a width to conform to the thickness of a side of the pane through which light from the point light sources shines into the pane. A band cut off the tape is simply laid onto the pane the edge of the band aligned and preferably matched with an edge of the pane. The tape covers the side of the pane. The masks are marked onto the tape and shade the LEDs shining in through the side so that there are not any bright and dark areas on the face. Hence an observer looking at the light panel does not see a light pattern caused by the light sources because the shade only lets light of uniform intensity enter the side of the pane. Advantageously only light of a uniform intensity shines out of the face of the pane.

Preferably a lengthwise edge of the tape has a shape to follow a contour of the shaded region. Preferably the lengthwise edge of the tape follows a contour of the shaded region. Preferably the edge is cut with a straight edge or an edge that follows the contour.

Preferably the opacity of the regions is graduated to decrease in register with the brightness the light pattern from a central portion of the regions to the edge of the regions.

Some portions of the regions are relatively opaque compared to other portions of the region. The portions of the region that are most opaque are those portions that are in register with the areas of the light pattern that are most bright. The portions of the region that are least opaque are those portions that are in register with areas of the light pattern least bright.

The portions of the regions that are most opaque have a preselected opacity to allow a preselected intensity of light from the bright areas to pass through them. The portions of the regions that are least opaque have a preselected opacity to allow the same preselected intensity of light from the least areas to pass through them.

Preferably the regions have a preselected tint of white colour which varies in register with the brightness of the areas.

Advantageously the effect is that a uniform intensity of light is transmitted through all portions of the regions. An observer looking at the light panel shaded by the shade sees a uniform intensity of light emitted from the panel where the panel is shaded by the shade.

Preferably the regions have a fringe along the perimeter having a lower opacity than the central portion of the regions.

Preferably the regions are connected to form a contiguous shaded region on the film. Preferably the regions comprise a stripe of preselected opacity parallel to the lengthwise edge of the tape, and the stripe connects the regions. Preferably the opacity of the stripe is uniform in the lengthwise direction of the tape. Preferably the stripe has a lengthwise edge of proximate a lengthwise edge of the tape. Preferably the stripe has another lengthwise edge intermediate the lengthwise edges of the tape.

Preferably the portion of the stripe with highest opacity is the portion proximate the lengthwise edge of the tape. Preferably the opacity of the stripe is graduated so as to decrease from the lengthwise edge of the tape so as to be a minimum at along the lengthwise edge intermediate the lengthwise edges of the tape. Advantageously the stripe is ideal for shading a bright stripe along the edge of the panel.

Preferably the face shade has a shape to cover substantially an entire face of the light emitting pane. The shade is ideal for reducing the intensity of light transmitted through the pane from LEDs, fluorescent tubes or other light sources distributed across the entire face of the pane or the backing panel. The shade is marked with masks across the entire sheet so that the locations of the masks on the sheet correspond with the location of the LEDs, fluorescent tubes or other light sources across the pane and the bright and dark areas they produce.

Preferably the masks have varying regions of translucence corresponding to a map of light intensity radiated from the face of the pane. The bright areas on the pane gradually transition to dark areas. In order for the masks to pass through a uniform intensity of all areas the masks have varying regions of translucence and/or opacity and/or colour or tint to compensate for the varying intensity of the bright and dark regions. Preferably each mask has preselected colour and/or translucency corresponding to the map to regulate the intensity and colour of light transmitted. Preferably the primary masks transmit different spectral regions.

Adding cyan and magenta to white ink compensates for yellowing of the light that would otherwise occur where it is transmitted through the partially opaque masks. Preferably the percentage of tint, be it cyan or another colour or shade, is adjusted to an amount corresponding to the rating of an LED shining into the pane. A Kelvin rating is an example temperature-rating for a point light source such as an LED. Preferably the temperature rating corresponds to the spectral colour of the LED.

Preferably portions of the regions are comprised of ink that is at least 70% white ink, and up to 30% of a mixture of cyan ink, magenta ink, and black ink so as to transmit white light from the areas. By tinting the ink with cyan, magenta, and black the yellowing effect on light transmitted through white ink comprising titanium dioxide is countered. Advantageously this ratio of cyan, magenta, and black is especially effective at countering the yellowing effect of ink made white with titanium dioxide on light transmitted through the regions.

Preferably the colour of each region of the shade is formed by a white ink tinted with between 0.1% and 25% cyan and between 0.1% and 25% magenta ink. Preferably the white ink is tinted with up to 6% black ink. More preferably the percentage is between 5% and 25% cyan ink and between 5% and 25% magenta ink.

Advantageously this ratio of cyan, magenta, and black is especially effective at countering the yellowing effect of ink made white with titanium dioxide on light transmitted through the regions.

Where colour tinting is added to predetermined portions of the regions, the tinting offsets the 'yellowing' of light transmitted through white ink, especially when using higher opacities of white ink printed on clear film.

Preferably the ink comprises titanium dioxide and an optical brightener which absorbs light in the ultraviolet spectrum and re-emits the light in the blue spectrum. The emitted blue light counteracts the yellowing effect.

Preferably the film tape has a uniform thickness between thirty microns and one hundred microns thick. Advantageously a film that is at least thirty microns thick has adequate weight and thickness to be manageable in positioning on a light panel without being too fragile to handle. A film that is one hundred microns thick or less does not produce a reflected line along the edge of the film. Most preferably the thickness of the film is between thirty-five microns and sixty-five microns.

Preferably the film tape includes a strip of transparent adhesive between 0.5 millimeters and 2.0 millimeters wide arranged only along the length of a lengthwise edge of the film tape. Preferably the strip of transparent adhesive is located in intermittent strips. Preferably the transparent adhesive is comprised on a 0.5 millimeters to 2.0 millimeters wide layer of adhesive tape stuck along the edge of the film tape. Preferably the shade comprises the film tape and adhesive tape together.

Preferably the shade comprises a secondary film overlaying the primary film, wherein the secondary film is translucent or transparent and marked by a corresponding second mask for each point light source. Masks with different colours and/or tints can be easily applied to a respective different film to simplify manufacture. Masks on the first and/or second film may have edges of fading opacity to complement each other and cancel the effect of varying light intensity between the bright and dark areas. Preferably the second masks have a different translucency than the first masks. Preferably the dimensions and/or arrangement of the second mask are different to that of the first mask.

Preferably the primary film is comprised of a material susceptible to static electricity such that the primary film sticks to surface of the pane when brought into contact. No adhesive is required. If the shade needs to be removed from the film no sticky residue is left on the pane. The static electricity sticking effect diminishes with multiple applications therefore an additional method of adhesion may be required.

Preferably the primary film comprises a layer of adhesive so as to stick the primary film to the pane when brought into contact. Adhesive may be used to permanently or temporarily attach the shade to the pane.

Preferably the adhesive has a preselected colour or translucency to regulate the intensity and colour of light transmitted. As light is transmitted through the adhesive before it is observed by a viewer of the light panel, the colour and tint transmitted through the adhesive can be adjusted so that it is uniform with the light radiated directly from the face of the pane.

According to another aspect of the invention there is a light source shade for a light panel, wherein the shade has the form of a layer demarcated by a plurality of primary masks, each mask is dimensioned and arranged so as to shade a light pattern corresponding to a point light source arranged to shine through a light emitting pane of the panel so that light radiates from said panel with uniform intensity.

According to another aspect of the invention there is shade to transmit uniform light emission from a light panel having bright and dark areas; the shade has the form of a film tape which has regions of various preselected opacity spanning the length of the tape, characterised in that the opacity of the regions varies in register with the brightness of the areas.

Preferably the shade is arranged to transmit uniform light transmission from a light panel having alternating bright and dark areas.

Preferably the shade has the form of a film for use on a surface of the light panel; the film has regions of differing opacity and/or reflectivity characteristics so that in use light is emitted from the surface of the panel with uniform intensity.

Preferably the opacity and/or reflectivity characteristics of the film are such that light emitted from the surface of the panel is diffused in proportion to its intensity.

According to another aspect of the present invention there is a method of making a light panel face radiate with un-mottled intensity by: selecting locations with respect to point sources of light arranged around the perimeter and/or across the area of the panel, mapping the light intensity at the locations, calculating a shape and a translucency of a mask corresponding to each point source, marking a film or other layer with the mask and covering a side of the light panel with the film, so as to shade the point light sources from the pane.

Advantageously the shade a tape that is easily placed in the correct position to remove from view the mottled face and uneven areas due to the light sources, especially point light sources arrayed along the side of the light emitting pane. Preferably to correctly position the edging tape the edge of the tape is laid contiguous with the edge of the slide or surface design layer.

Preferably the method utilizes steps of marking the film whereby the film has regions of varying reflectivity and/or opacity so as to define the mask, dimensioning and arranging the masks to lie in register with the light sources, covering a side of the light panel with the film so the masks lie in register with the point light sources and thereby ensure uniform light emission from said panel.

Preferably the film is marked by a printer which applies ink comprising any combination of white ink, magenta ink, cyan ink, yellow ink, and/or black ink thereby printing regions of varying reflectivity and/or opacity on the film strip so as to define masks. The most preferable combination includes white, cyan, magenta and black. Advantageously by excluding yellow, it minimises a yellowing effect of the light caused by using white ink.

Preferably the film is marked by spraying or printing onto the film or directly onto the light panel or surface design layer or slide a chemical coating that coats the surface with a light scattering layer. Advantageously the light scattering layer is partially opaque. Preferably the regions comprise a light scattering layer, wherein the opacity of the light scattering layer is proportional to the thickness of the layer and the thickness of the layer varies in register with the brightness of the areas. The opacity of the light scattering layer is greater to coincide with the brightest areas and is proportionate to the varying levels of brightness.

Specific locations on the film where the regions of preselected opacity are located have a preselected opacity that coincides with the brightness of specific locations on the light emitting pane. Thus the preselected opacity of the regions varies in register with the intensity of light transmitted through specific locations of the light emitting pane. The locations on the shade where the regions are most opaque correspond to the locations of the brightest areas on the light emitting pane.

The face of a light panel may be used as a backlight for a thin polymer, canvas or glass sheet or other material/product which is translucent or transparent having pleasant colours and images printed thereon or attached thereto. The sheet is known in the art as a slide or surface design layer. A light panel with a mottled face and uneven areas of brightness can spoil the view of colours and images on the slide resulting in poor visual impact.

According to another aspect of the present invention there is provided a slide or surface design layer and a light panel for use as backlight for the slide or surface design layer, wherein the slide or surface design layer comprises a shade of primary masks, the slide or surface design layer is arranged with respect to the light panel such that each mask is arranged so as to shade a light pattern corresponding to a point light source, a fluorescent tube or other light source arranged to shine through a light emitting pane of the panel so that light radiates from said panel with uniform intensity.

The slide or surface design layer is translucent or transparent having preselected colours and images printed thereon or attached thereto. Advantageously the shade of primary masks remove from view the mottled face and uneven areas of brightness of the light panel which would otherwise spoil the view of colours and images on the slide.

According to another aspect of the present invention there is provided a light panel for use as backlight for the slide or surface design layer, wherein the light panel comprises a shade of primary masks such that each mask is arranged so as to shade a light pattern corresponding to a light source arranged to shine through a light emitting pane of the panel so that light radiates from said panel with uniform intensity. Preferably the light source is a point light source such as an LED or preferably a long light source such as a fluorescent tube.

Preferably the shade comprises a film; the film has regions of differing print characteristics so that in use light is emitted from the surface of the light panel with uniform intensity. Advantageously a slide or surface design layer is easily modified by application of the film to provide the slide or surface design layer with the shade.

Preferably the film is in the form of tape referred to as an edging tape because it is for use along a perimeter edge of the slide or surface design layer or light emitting pane of light panel. Preferably the edging tape has a lengthwise edge that is positioned along an edge of a light emitting pane that incorporates light point sources. Preferably when in position the edging tape covers the light emitting pane as a border or strip surrounding the perimeter of the pane.

Preferably the edging tape has a uniform opacity in the lengthwise direction of the tape. When the edging tape is in position, the opacity of the border of the face of the light panel is uniform in the direction parallel to the edge of the border.

Preferably the shade in the form of a tape, and particularly preferably the edging tape, has printed or marked on it a region comprising a strip of ink or other light diffusing substance. Preferably the opacity of the shade decreases from a region of maximum opacity proximate the outer perimeter of the light panel where the reflected light from the sides is at its brightest and decreases to a region of minimum opacity proximate the inner perimeter of the border.

Where the tape has a uniform opacity in the lengthwise direction there are no primary or secondary masks of different preselected opacity, since the opacity along the lengthwise direction is uniform.

Preferably when the tape, and especially the edge tape is in position, the slide or surface design layer or light emitting pane of light panel preferably has an opaque margin or border along the edge. To position the tape the edge of the tape is laid contiguous with the edge of the slide or surface design layer.

Preferably the tape is positioned along the edge of a side of a light emitting pane that does not incorporate light point sources. There is bright stripe of light on the face of the light emitting pane adjacent to this edge. The bright stripe is brighter than the central surface of the light panel. The bright stripe is due to light which reflects from the light sources which shine into other sides of the light emitting pane.

Preferably the tape will have printed or marked on it a strip of ink or other light diffusing substance. Preferably the strip is most opaque nearest to the lengthwise edge of the tape that is in use aligned with the outer perimeter of the edge with the bright stripe. Preferably the opacity of the stripe decreases to a region of minimum opacity proximate the inner perimeter of the border. Preferably the tape creates a border or strip along the perimeter of the light panel of uniform brightness on the face of the light panel.

Preferably the shade is a layer of material of preselected opacity which is printed on a slide, or surface design layer or a light panel and takes the place of a shade in the form of a tape.

Preferably the edging tape is printed or marked on film which is cut into a strip. Preferably it is printed or marked directly onto the light panel. Preferably it is printed directly onto the slide or surface design layer.

Preferably the shade has the form of a tape or a layer of material of preselected opacity which is a border to cover an area proximate the perimeter of the light emitting pane of the light panel and ensure substantially uniform light transmission from said panel. A light emitting pane may have a slot in its perimeter edge that gives rise to a bright stripe of light adjacent to the perimeter edge from a light source arranged to shine into the side around the perimeter and out through the face of the pane. A light emitting pane may have a side around the perimeter which reflects light into the interior of the pane. These features of the pane give rise to a bright stripe of light on the face of the pane adjacent to the perimeter edge of the pane.

Advantageously the shade in the form of a tape or band, or the shade in the form of a border printed or marked directly onto film or onto the slide or surface design layer or directly onto the light panel is arranged to cover and shade the bright stripe on each of the reflected edges and those illuminated by the light point sources so as to ensure substantially uniform light transmission from said panel.

The bright stripe is brightest proximate the perimeter edge of the pane and fades to less bright towards the central region of the pane. Preferably the opacity of the shade in the form of a tape or border to cover the bright stripe decreases from a region of maximum opacity proximate the outer perimeter of the border to a region minimum opacity proximate the inner perimeter of the border. Advantageously a substantially uniform intensity of light is transmitted though the shade from the area proximate the perimeter of the light emitting pane. Preferably the opacity of the regions is preselected so that the brightness of the light panel is substantially uniform when the bright stripe proximate the perimeter is covered by the shade. Advantageously the features of the film and tape described herein are applicable as improvements to the film comprised with the shade.

Preferably the film is in the form of a sheet shaped to cover substantially the entire face of the slide or surface design layer. Advantageously the film is easily placed in the correct position by laying the edges of sheet of film contiguous with the edges of the surface design layer. All the mottled areas of the light panel are removed because the entire slide or surface design layer may be arranged to cover the entire face of the pane of the light panel.

Preferably the print characteristics of the shade are such that light emitted from the surface of the panel is diffused in proportion to its intensity. Advantageously this criteria for creating the opacity of the masks is effective at making the mottled areas invisible.

Preferably the slide or surface design layer is integrated with the shade.

Advantageously by integrating the shade into the slide or surface design layer a light panel can be used with only the slide or surface design layer. An image provided on the slide or surface design layer will not be marred by mottled light intensity on the pane of the light panel because the integrated shade evens out the intensity of light from the mottled areas of the pane.

Preferably the integrated shade is in the form of a film demarcated by a plurality of primary masks. Advantageously the film may be applied directly on the slide or surface design layer. Hence a separate device or means to suspend the shade with respect to the pane is not required. The shade does not need to be applied to the pane if it is integrated with the slide or surface design layer. Hence a pane is more easily replaced, since when the pane is replaced the shade does not need to be applied to it.

The invention will now be described, by way of example only, with reference to the accompanying drawings in which:

DETAILED DESCRIPTION OF THE INVENTION

Figure 1:
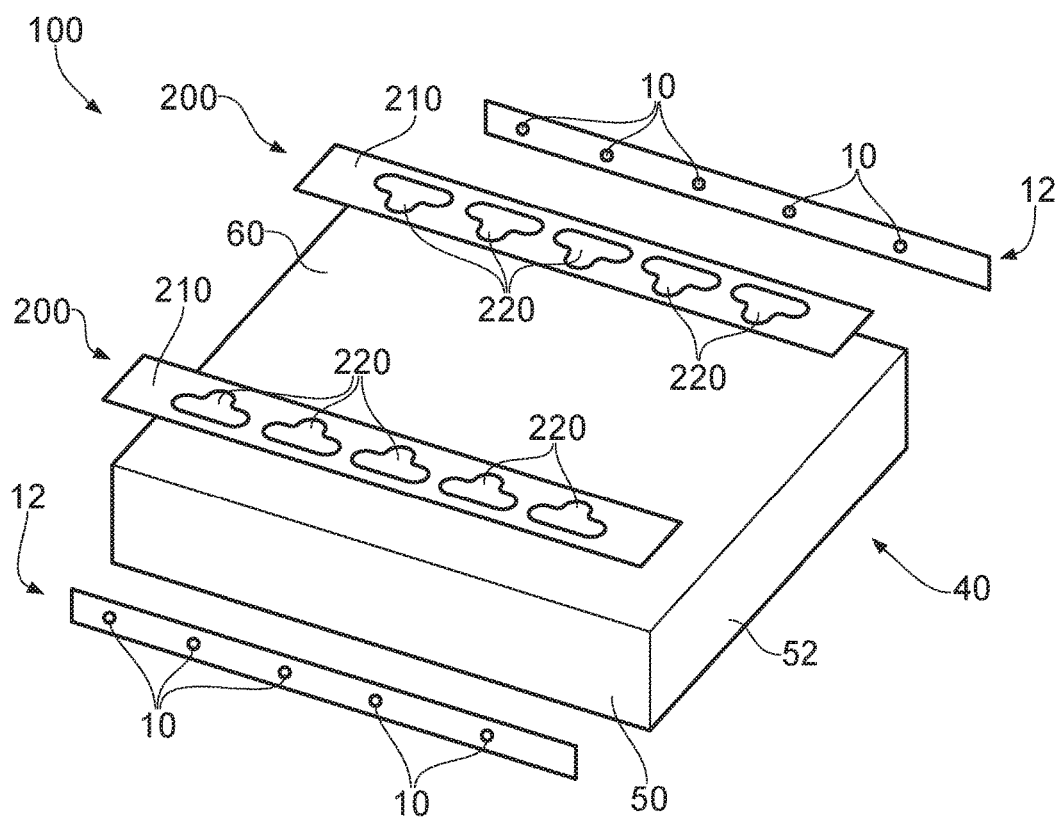
FIG. 1 is an exploded assembly view of a light panel according to the invention.

Referring to the Figures, there is shown in FIG. 1 an exploded view of a light panel 100 comprising a light panel shade 200. The light panel also comprises a pane 40 which is a transparent or translucent plate of polymeric material or glass. Located at the perimeter of the pane 40 is an LED strip 12 that comprises a row of LEDs 10. The LEDs are arranged to shine in through a side 50 of the pane 40. The light that shines into the pane 40 through the side 50 also shines out of a face 60 of the pane 40. A person viewing the light panel can see though the pane even when it is illuminated by the point sources along the perimeter unless an opaque or translucent or white backing panel is used.

The light panel shade 200 is made from a polymeric film. Suitable films are not limited to photographic film. In one embodiment the film can be is made from a material that due to the effect of static electricity tends to be drawn to stick face to face to the pane. The film may also have a sticky adhesive on a side to assist sticking the light panel shade 200 to the face 60 of the pane 40.

Figure 2:
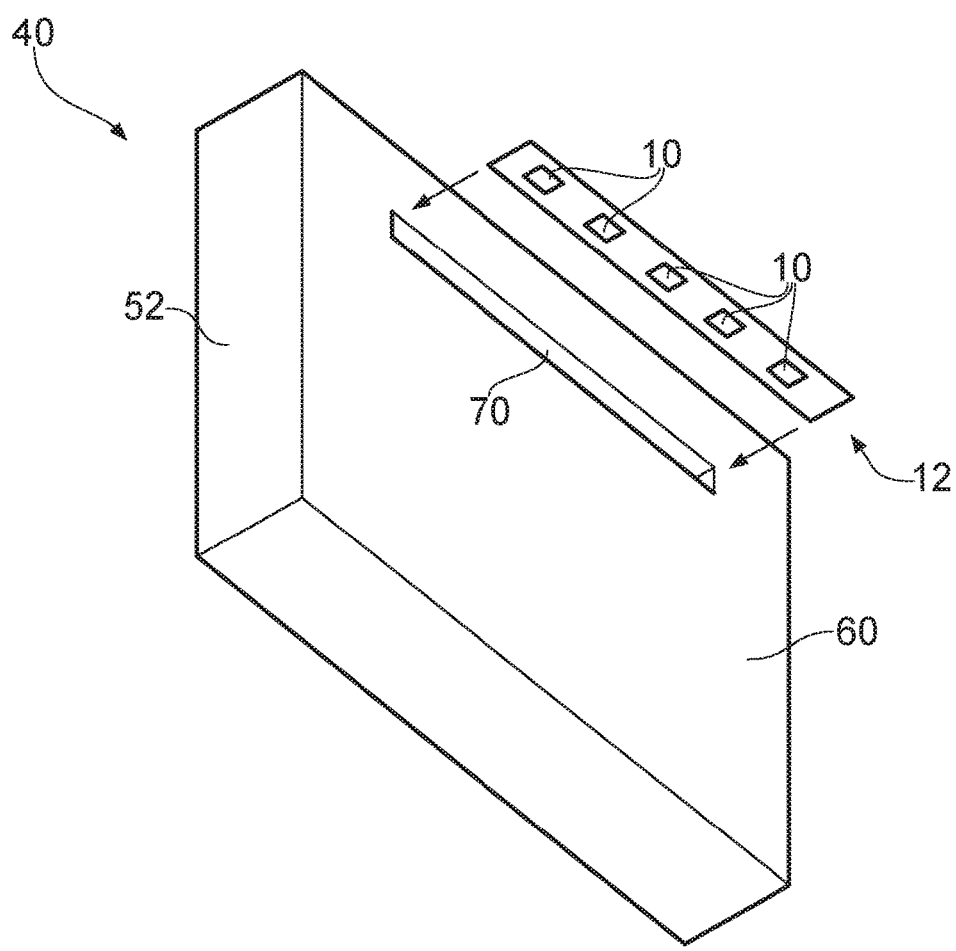
FIG. 2 is an exploded assembly view of an LED light strip for insertion into a slot in a pane.

In FIG. 2 there is shown a pane 40 of a light panel. The pane 40 comprises a slot 70 through the face 60. The slot 70 is aligned with a side 50 of the pane 40. An LED strip 12 0 comprising a row of LEDs 10 is located in the slot 70 and arranged to shine towards the center of the pane 40. Light from the LEDs illuminates the face 60 of the pane 40 and it also shines out of the opening slot 70 opening the face 60 making the slot visible as a bright line on the face 60.

Figure 3:
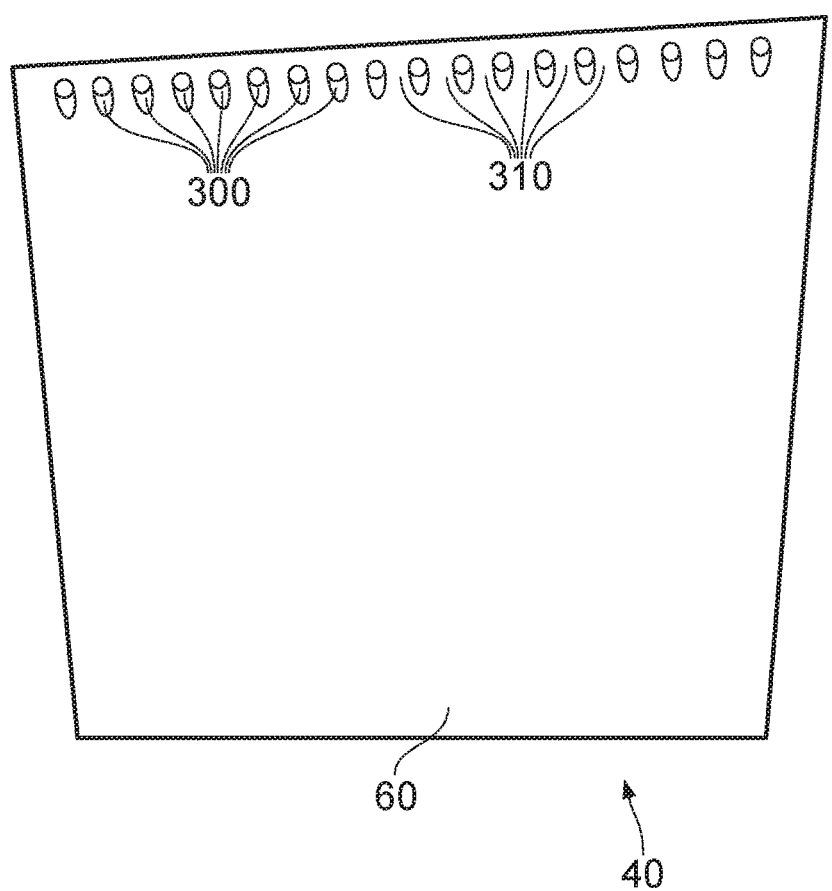
FIG. 3 is view looking at the pane of a light panel illuminated by LEDs fixed to a side of the pane.

In FIG. 3 there is shown a section of an illuminated light panel. At one edge of the pane 40 there are bright areas 300 between darker areas 310. Each bright area is located in the vicinity of an LED fixed to a side of the pane 40. In the areas between the LEDs there are dark areas 310. The adjacent bright area 300 and dark areas 310 mottle the face 60 of the pane 40 in the vicinity of the perimeter of pane. The face of the pane therefore does not radiate light with even intensity in the region of the perimeter.

Also in FIG. 3 it is demonstrated that one side of the light panel incorporates point light sources shining in through the side. On smaller panels of less than substantially 30 cm×30 cm a single side with point light sources is sufficient to illuminate the panel. In larger panels it is preferable to incorporate two or more sides of point light sources to increase the light transmitted along the surface of the panel. All four sides on a large rectangular panel will therefore preferably incorporate light point sources. A large hexagonal panel would preferably incorporate light point sources on six edges.

FIG. 3 also shows three sides that do not incorporate point light sources. Sides that do not incorporate light point sources will still show as areas brighter than the overall surface of the light panel because light will reflect off a side, whether or not there are light sources along the side. A bright light reflection which will have the appearance of a brighter stripe along the perimeter of the light panel is visible along the perimeter edges of the panel.

Figure 4:
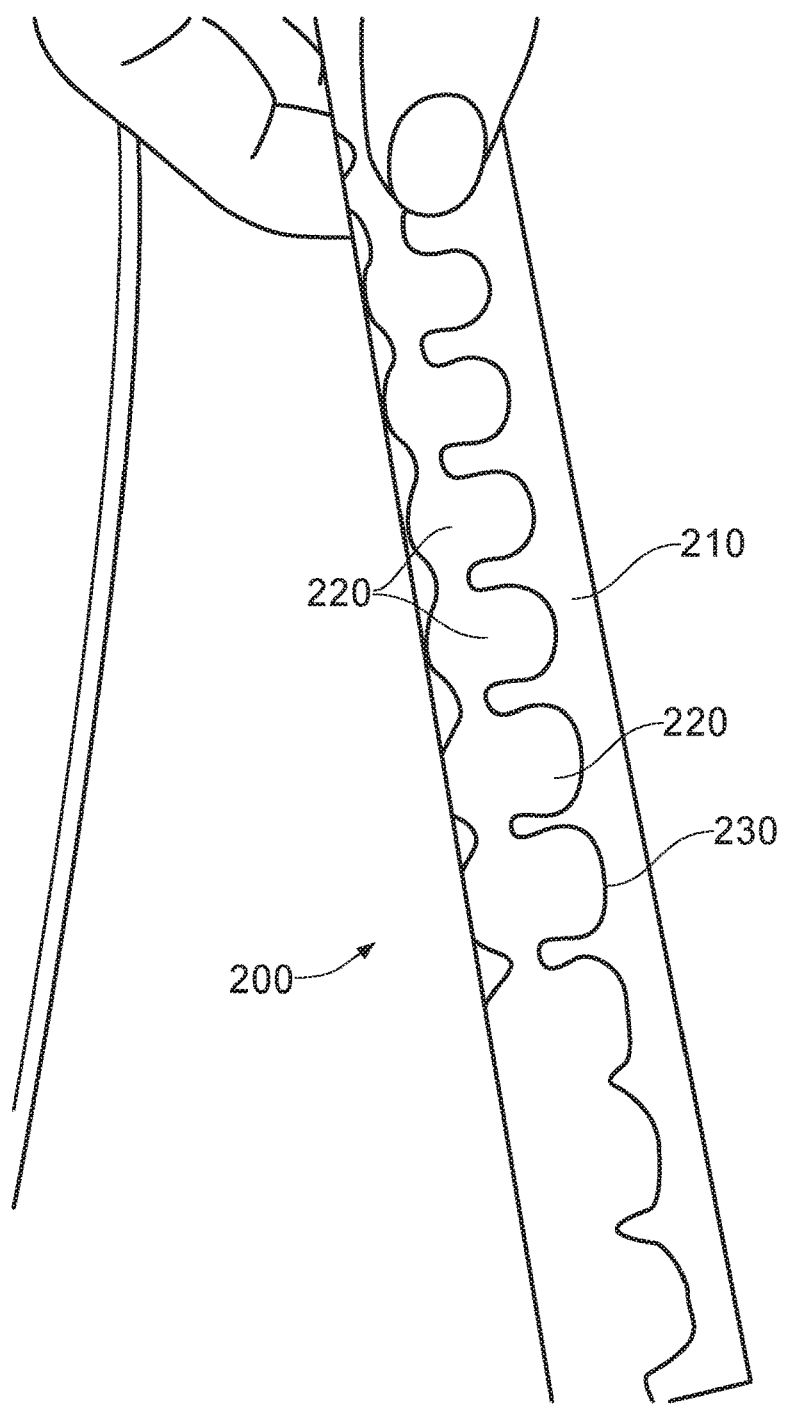
FIG. 4 shows a light panel light source shade.

FIG. 4 shows a light panel light source shade 200 in the form of a strip of film. The film 210 is transparent and is marked with a row of shaded regions which span the length of the tape and are appears as masks 220. The masks are spaced apart according to the spacing of the bright areas 300 running along the perimeter of a pane 40 corresponding light panel as shown in FIG. 3.

The shape of each mask 210 is determined by mapping the intensity of the light on the face 60 of the pane 40. The intensity varies as shown in FIG. 3 where there are bright areas 300 and interspaced by dark areas 310.

Specific locations on the film where the regions of preselected opacity are located, correspond to specific locations on the pane where the bright areas and dark areas are located. The opacity of a specific location in a region of the film having preselected opacity is in register with the brightness of the corresponding location of the pane.

The masks 210 are white or predominately white colour. The masks 210 vary from nearly opaque or totally opaque depending on the brightness of the light and therefore the opacity of mask required to diffuse it in the central area of each mask to nearly transparent near the edge of the mask. The amount of light transmissibility of each area is preselected according to the map of the intensity of the light on the face 60 of the pane 40.

In areas of the mask 210 corresponding to the brightest areas 300 on the face 60, the mask is nearly opaque or totally opaque. In the areas of the mask 210 corresponding the darkest areas 310 on the face 60 the masks are nearly transparent. In the areas of the mask between the nearly opaque and nearly transparent areas the light transmissibility of the mask varies according to the light map.

Figure 5:
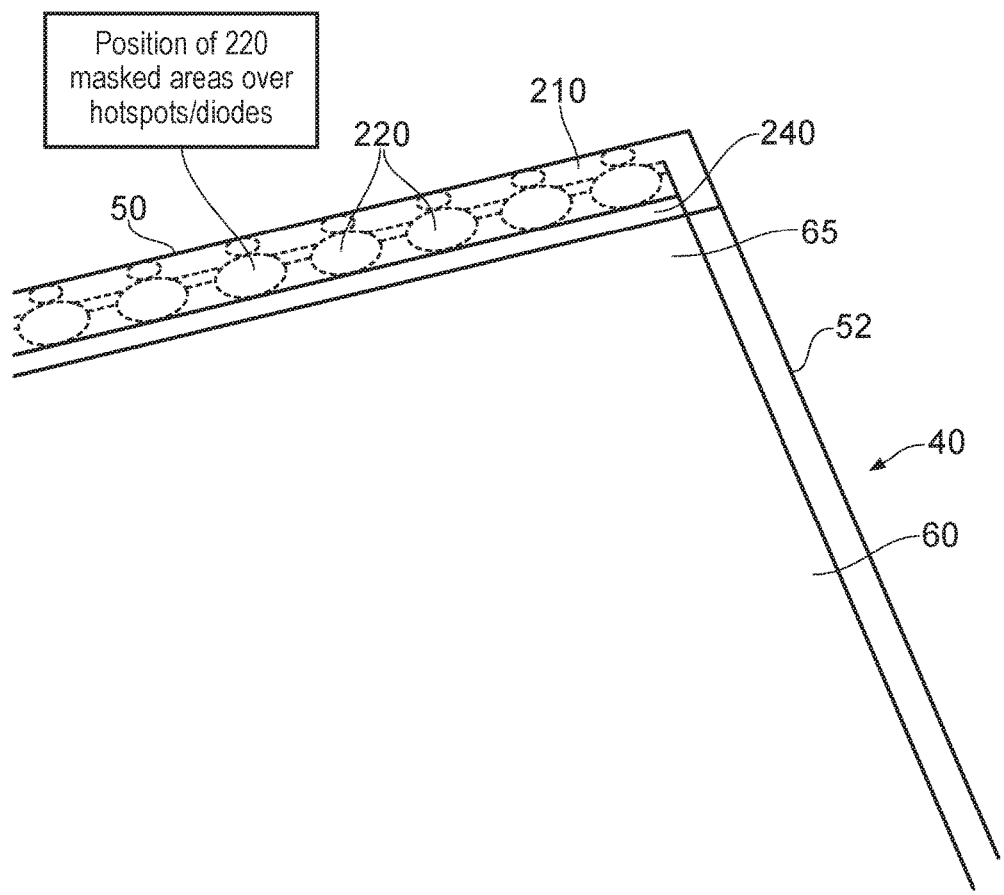
FIG. 5 shows a pane of light pane with a light source shade in the form of a strip masking bright areas on the perimeter of the pane.

The light panel light shade 200 is placed on the face 60 of the pane as shown in FIG. 5. The shade is located on the face 60 of the pane 40 where the nearly opaque areas of each mask 220 cover the brightest areas 300 on the face 60. The transparent areas of the shade cover the dark areas 310 on the face.

In FIG. 5 the shade 200 in the form of tape is shown in use on the face 60 of a light emitting pane. The shade 200 is shown in FIG. 4, and the shade 200 is shown in more detail in FIG. 12.

The shade 200 comprises a transparent primary film 210 having regions of various opacity to define primary masks 220 distributed along the tape and arranged in a row parallel with the lengthwise direction of the tape to, in use, lie in register with a light pattern comprising alternating bright 300 and dark 310 regions on a light emitting pane 60. When the masks are in register with the alternating bright 300 and dark 310 regions, the side 50 of the face of the pane 60 is collinear with a lengthwise edge of the tape.

The shape and transmissibility of the masks 210 is such that the intensity of the light that shines through the light source shade 200 is substantially uniform over the entire area of shade.

Figure 12:
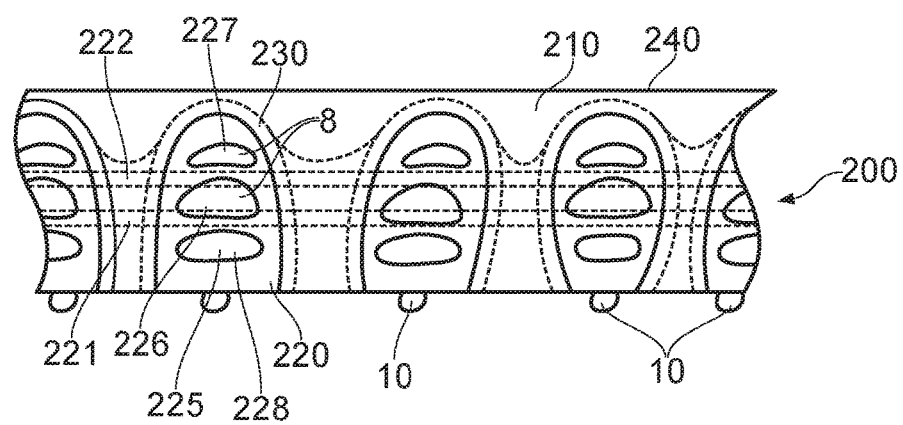
FIG. 12 shows a detailed view of the light panel light source shade shown in FIG. 4 and FIG. 5.

FIG. 12 shows the shade 200 in more detail. The shade 200 comprises a film and has the form of a strip and is also known as a 'shade strip' 200. A long strip is a tape and can be rolled into a tape roll.

In FIG. 4 and FIG. 12 the shade has a region of preselected opacity 220, 221, 222, 225, 226, 227, 228, 230 which spans the length of the tape. A portion of the region comprises primary masks 220 of preselected opacity. In FIG. 4 each of the primary masks 220 is shown to have an oval shape. In FIG. 12 the primary mask 220 is shown to have an elongate shape extending from a lengthwise edge of tape. The shape of the masks may differ from that shown in FIG. 4 or FIG. 12 because the shape is tailored for a specific arrangement of lights for a specific light panel. The masks are arranged on the film 210 in a row parallel to the lengthwise edge of the strip or tape.

Shown in FIGS. 4, 5, and 12 are stripes of white ink 221, 222 offset from the lengthwise edge of the tape and aligned parallel to the lengthwise edge. These stripes of mask connect the primary masks 220. They also shade stripes of light on the face of the light emitting pane caused by light shining into the side 50 of the pane.

Shown in FIG. 12 is a portion of the region of preselected opacity that is a fringe 230 along the edge or rim of the primary mask 220. The fringe 230 has a lower opacity than the primary mask. The opacity of the fringe is graduated so that the fringe is most opaque where it is adjacent the primary mask 220. The fringe is least opaque near the edge farthest from the primary mask. The fringe ensures that when the shade is in use covering the light pattern by covering the face of the pane in register with the light pattern that the light transmitted through the shade from face of the pane appears uniform.

FIG. 12 shows that there are secondary masks 225, 226, and 227 on a portion of the primary mask 220. The secondary masks comprise white ink. The secondary masks are places so as to provide additional shading for especially bright spots on in the light pattern.

FIG. 12 also shows that there are portions 225, 226, 227 of the region of preselected opacity that have different preselected opacity than other portions of the region. These portions may be located within the portion of the region that is a primary mask as is shown in FIG. 12, but this is not necessary. The portions 225, 226, and 227 may be tinted to a different tint than other portions of the region of preselected opacity. The tint may be a black or blue tint form by tinting white ink with cyan, magenta, and black ink. The portions of the masks so tinted negate yellowing of light transmitted through the masks from the face 60 of the pane.

Figure 13:
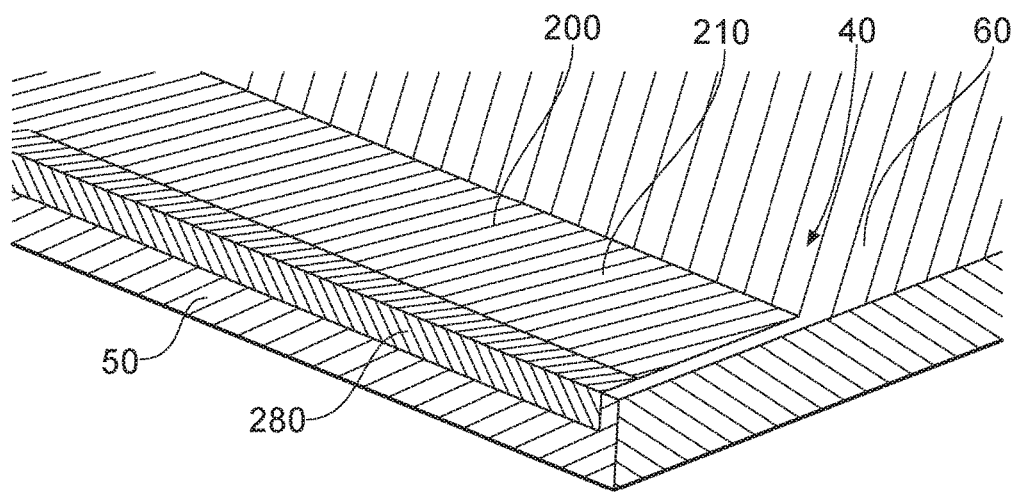
FIG. 13 shows a shade in the form of a film tape fixed light emitting pane of a light panel with a strip of adhesive tape along an edge of the shade.

FIG. 13 shows a shade 200 comprising a film strip 210. The film strip 210 is laid onto the face 60 of a light emitting pane 40. An adhesive strip 280 is laid along a lengthwise edge of the film strip 210. The adhesive strip 280 overhangs the lengthwise edge of the film strip. The adhesive strip is set along the lengthwise length of the film strip. The adhesive strip is between 0.5 millimeters and 2.0 millimeters wide. The length of the adhesive strip that overhangs the film strip is bent over corner edge of the light emitting pane and stuck to the side 50 of the pane.

The intensity of the light let through the light source shade near the edge 240 of the shade nearest the center of the face 60 is substantially the same as the intensity of the light radiating from the face 60 of the pane in the area 65 nearest to the edge 240 of the shade nearest to the center of the shade. The effect is that with the light source shade in position on the face 60 of the pane, there are no mottled bright and dark areas on the surface of the pane. To an observer viewing the face 60 of the illuminated pane, the entire face appears to have uniform brightness when viewed through the slide or surface design layer.

A light panel 100 comprising the shade 200 has uniform brightness of face and is ideal for use as a backlight since a slide can placed directly against the face 60 and the shade 200 without being spoiled by mottled light areas. Also thereby the entire illuminated area of the panel is utilized for maximum efficiency of the light produced.

A light panel 100 comprising the shade 200 does not require a light box to support a slide above the face 60 of the pane. This saves the cost of light box. A light panel without a light box is also relatively thin. A thin light panel is preferred where the light panel is used to light walls of a narrow hallway or a low ceiling.

Figure 6:
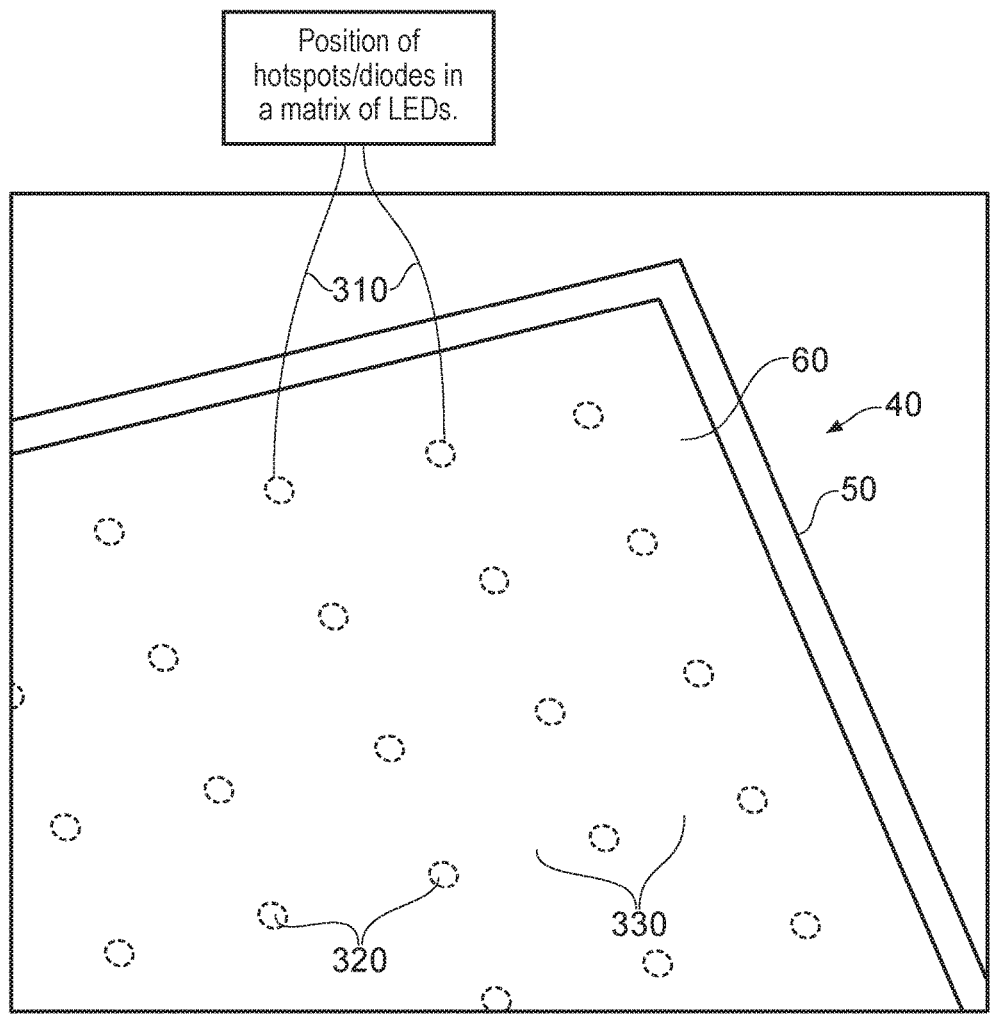
FIG. 6 shows a view looking at a pane of a light panel having LEDs embedded in the central region of the pane.

FIG. 6 shows a face 60 of a portion of a pane 40 of a light panel wherein point light sources 320 are located in a central area of the pane 40. The light sources 320 may be LEDs embedded in the pane 40 or fixed to the back surface of the pane face 60. The LEDs are arranged to shine light out through the front of the pane face 60.

Where the point sources 320 are located in the central area of the pane 40, corresponding bright areas are produced on the face 60 of the pane 40.

Figure 7:
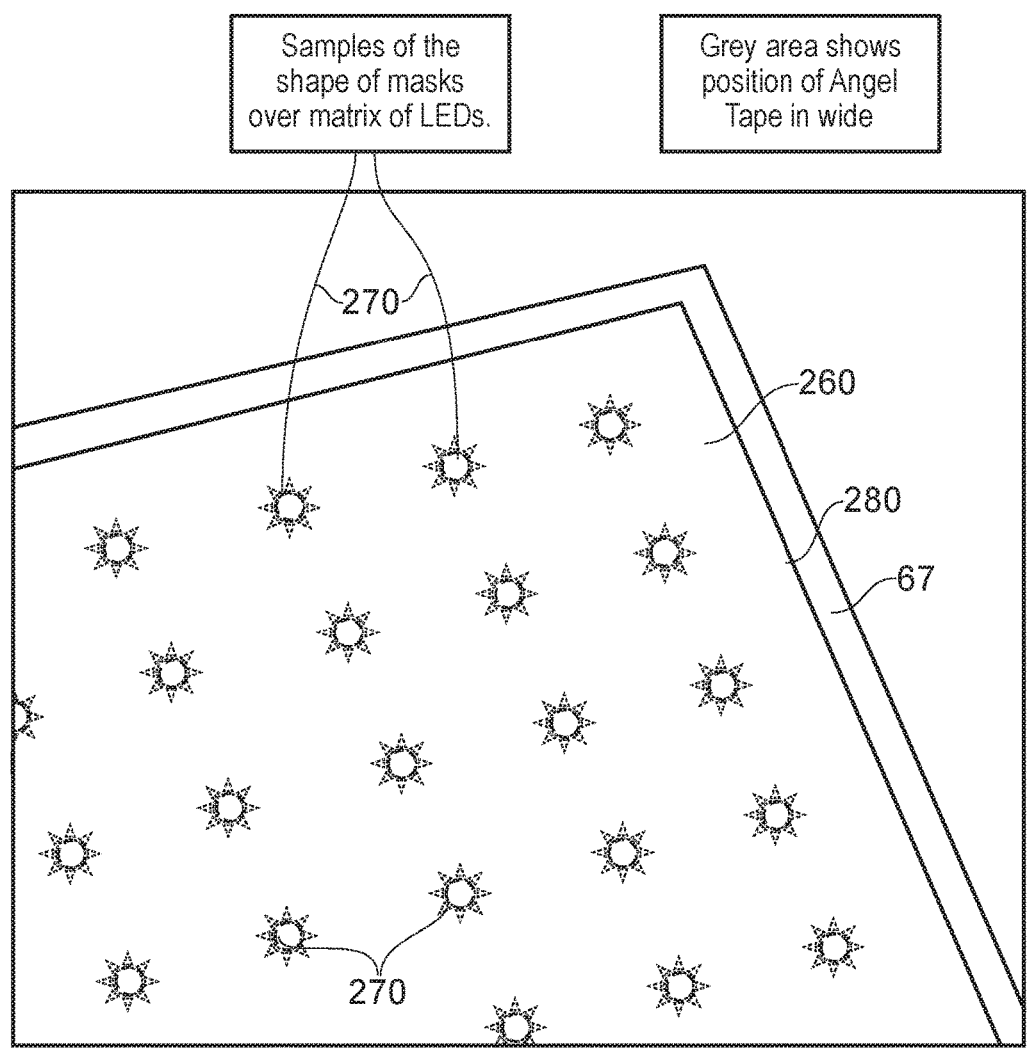
FIG. 7 shows a view looking at a pane of a light panel with a light source shade in the form of a sheet masking bright areas on the central area of the face of the pane.

FIG. 7 shows a light source shade in the form of a film having the shape of a sheet 260. The sheet 260 is transparent or translucent or transparent marked with masks 270 of preselected opacity. The masks may also have a preselected colour or tinting. Each mask 270 is located on the sheet 260 in a position corresponding to a respective bright area 320 on the pane 60.

In one embodiment the sheet 260 is made from a film that is susceptible to charging with static electricity so that the sheet tends to stick to the face 60 of the pane 40 due to static electrical attraction. The sheet 260 may also be coated with adhesive on one side to stick the face 60.

The transmissibility of each mask 270 to light varies depending on the particular area of the mask. The mask 270 is most opaque near the central region corresponding to the area 320 on the pane that is brightest. The mask 270 is most transmissible to light near the edge of the mask. Between the central region of the mask where the mask is opaque or nearly opaque and the edge where the mask is nearly transparent, the transmissibility of the mask is graduated according to the intensity of the area on the face that the sheet 260 is intended to cover.

A map of the bright areas 310 on the face is produced by measuring the light intensity. With the light shade sheet 260 in place on the face 60 of the pane 40 each mask covers a corresponding bright area 310. The transmissibility each mask 270 is graduated so that the brightness of the face of the pane covered by sheet 260 appears to be uniform to an observer viewing the light panel 100. Thereby the entire illuminated area of the panel is utilized for maximum efficiency of the light produced, and the light panel does not require a light box to support a slide above the face 60 of the pane.

The light shade mask 220 also affects the shade or colour of the light transmitted through it. The film 210 of the light shade 200 does not affect the colour unless the film is not colourless and transparent.

The light shade 200 masks and/or film may be coloured or tinted to correspond with LEDs of different colours and spectral temperature ratings. A light panel fitted LEDs that radiate a preselected tint will radiate tinted light out through the face 60 of a colourless transparent or translucent pane 40. The light shade masks and/or film may be coloured and/or tinted so that the colour or tint of the light that shines through the masks and/or film appears to be the same as the colour and/or tint of the light before it shines through the film and/or the mask. A person observing the illuminated face of the pane sees no difference in the colour or tint of the light where it passes directly out of the pane and where it passes through pane and the light shade.

For example white LEDs may be preselected with a tint corresponding to Kelvin levels. To make the colour of the light transmitted though the mask 220 be substantially the same as the colour of the light transmitted directly out of the pane 40 the colour of the mask 220 may be shaded according to the Kelvin (K) level of the LEDs. An embodiment of a light panel with LED lights set to a level of 5300K would utilize a mainly white mask 220 that marks the film 210 wherein the white is mixed with a low percentage of cyan and magenta and black or other light diffusing substance. The percentage is the range of 0.01 percent to 25%. The tinted mask in this embodiment would prevent yellowing of white light transmitted through it. Other embodiments of a panel comprising LEDs with different Kelvin levels or different colours would require the ratio and colours of the ink to be calculated according to the colour of the LEDs.

Preferably the film has single static side so that the static side is arranged to stick to a glass or acrylic pane and the tape itself. The other side of the film has a surface to which ink readily adheres. Advantageously masks are preferably applied with ink to one side of the tape. The tape is stored and distributed on a roll for convenient application to a pane at a remote location such as a light panel manufacturing factory. The tape is advantageously rolled with the static side sticking to the side that has masks applied by ink. The ink does not get pulled off the tape when the tape is unrolled because the ink adheres preferably to the other side of the film.

The light source shade is also effective with panes of a light panel arranged differently to that shown in FIG. 2. For example the light source shade is effective with a light panel arranged with LEDs on the outside of pane and with LEDs set in a transparent or translucent tube.

Figure 8:
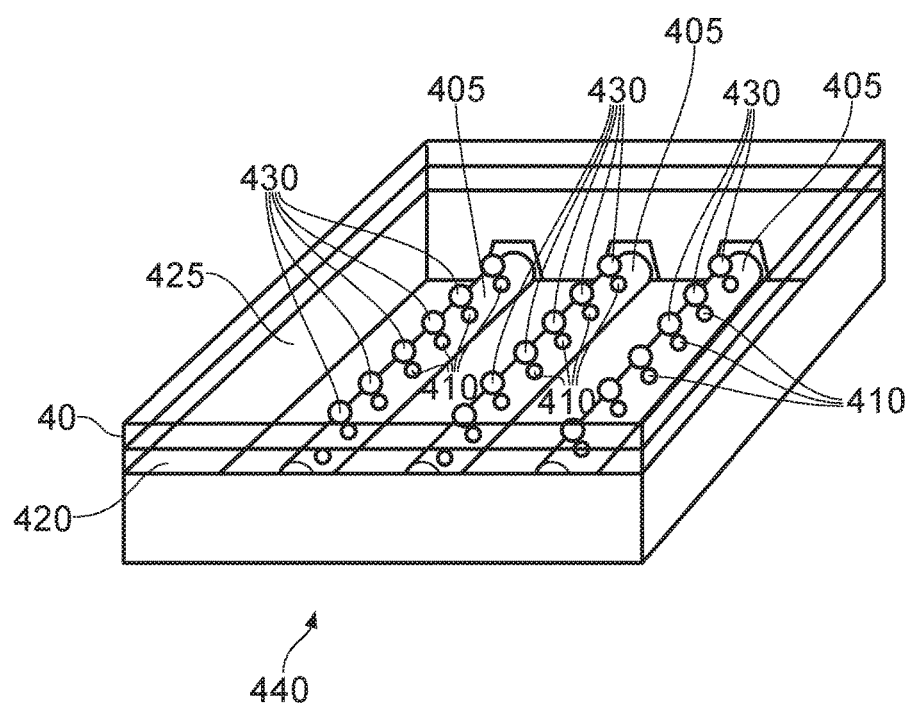
FIG. 8 shows parallel rows of lighted rods comprising LED lights and a masked sheet arranged between the rows of lighted rods and translucent or transparent panel.

An alternative arrangement for providing illumination through a transparent or translucent pane 40 of a light panel is shown in FIG. 8. A transparent or translucent panel 440 is illuminated by three lighted rods 405.

Lighted rods 405 are transparent tubes containing LED lights 10. In operation a lighted rod appears as a row of LED lights.

The LED lights shine through the pane 40 of the light panel.

It is desired for the transparent or translucent pane 40 of the panel 440 to appear as surface of uniform illumination. However if the LED lights were placed directly behind the transparent or translucent panel, they would spoil the uniform illumination effect. The LED lights would be visible as bright spots through the panel 440. The LED lights would also appear as bright spots on any translucent image placed on the panel which spoils the view of the image.

A variation of the present invention overcomes the problem of the LED lights being visible as bright spots through the panel. This variation comprises a masked sheet 420 as shown in FIG. 8. The masked sheet 420 is transparent or translucent in areas where it is not masked. These unmasked areas 425 are indicated on the masked sheet. The masked sheet also has masked areas 430. The degree of transparency or translucency of the masked sheet in the masked area is preselected.

The effect of the preselecting the degree of translucency that the amount of light that passes through the masked areas of the masked sheet results in the transparent or translucent pane 40 of the panel 440 being illuminated with light of uniform intensity across the entire surface area of the pane of the panel 440.

To achieve the effect of uniform light intensity across the surface area of panel several alternative methods of preselecting the degree of transparency or translucency of the masked areas are used either alone or in combination.

One method is to take a photograph of the panel 440 with a digital camera or using photometric or other light imaging equipment while the light from the LED light is shining through the panel. The intensity of the light shining through the panel is digitally recorded on a grid across the surface of the photograph. The amount of translucency or transparency of the masked area associated each point on the grid is calculated. A corresponding grid is produced on the masked sheet. This may be a virtual grid on simulated masked sheet or it may be an actual grid on the masked sheet or it may be an overlay grid sheet to overlay on the masked sheet. Instructions are written to produce the masked sheet 420 with the right amount of translucency or transparency at each location of the corresponding grid.

After the masked sheet 420 has been produced with the preselected degree of transparency or translucency in each masked area, the masked sheet is placed between the rows of lighted rods 410 containing LED lights and the transparent or translucent pane of the panel 440.

In use light radiated from the LEDS in the rods passes through the masked sheet 420. The light that passes through the unmasked areas 425 of the masked sheet does so with virtually no reduction in intensity. The light that passes through the masked areas 430 has its intensity reduced by an amount proportional to the degree of masking. As a result the intensity of light that reaches the transparent or translucent panel 440 has a uniform intensity across the area of the translucent panel. The result is that the LED lights are invisible to a person who observes the uniform intensity of light that has passed through the transparent or translucent panel. To this person the transparent or translucent panel appears as a lighted panel, wall, ceiling, floor, or other surface lit up with a light of uniform brightness across its area.

A slide or surface design layer, not shown in FIG. 8, can be placed above the pane 40 of the light panel 440. The light panel 440 is for use as backlight for the slide or surface design layer. In one embodiment the slide or surface design layer comprises the masked sheet 420. Hence masked sheet is an integrated shade of primary masks. The masked sheet is integrated with the slide or surface design layer. Each mask is dimensioned and arranged so as to shade a light pattern corresponding to a point light source 10 arranged to shine through the light emitting pane 40 of the panel 440 so that light radiates from said panel with uniform intensity.

Figure 9:
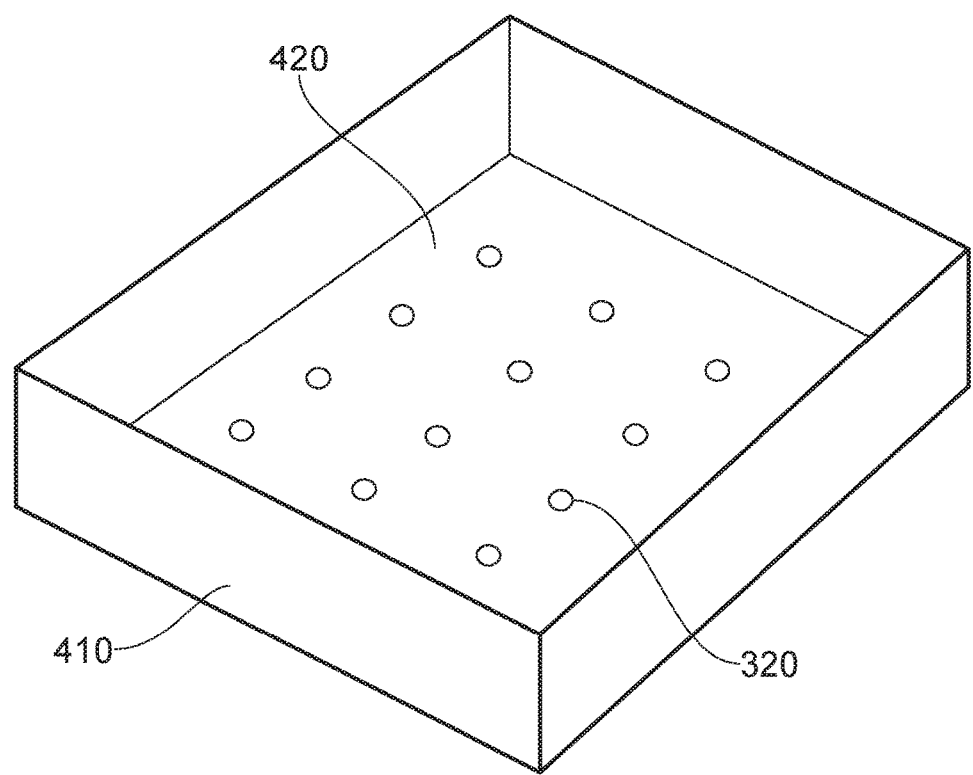
FIG. 9 shows an isometric view of a light box with an open top comprising light sources on the bottom.

FIG. 9 shows an alternative device for arranging the lights to shine through the panel. The light arranging device has the form of a shallow box with an open side. At the bottom of the box are light sources 10 such as LED light sources 10 or fluorescent tubes 505. The light arranging device comprises a perimeter wall 415 made of opaque material such as metal sheet. The wall surrounds the perimeter of the bottom 460 of the box. The light sources 10 are fixed to or near to the bottom of the box and surrounded by the wall.

The open side of the shallow box is covered by a transparent or translucent pane. The pane is shown in FIG. 8, but it is not shown in FIG. 9. The perimeter wall 415 of the box matches the perimeter of the panel so that pane closes the box with light sources inside. The gap between the light sources and the pane reduce the visibility of LEDs showing on the surface design layer on the panel. The height of the perimeter wall corresponds to the gap between the LED's and the pane.

A disadvantage of a light box with a high perimeter wall is that a light panel comprising the box covered by a pane has a height that can take up valuable space in a room.

A panel comprising a shade according to the invention does to not need a light box with a high perimeter wall. The gap does not need to be as great with a light source shade for a light panel. The shade obscures the light sources even for a relatively low walled light box.

An isometric view of a light box with an open box comprising fluorescent light tubes 505 at that bottom. This light box is similar to that shown in FIG. 8, the difference being the lighted rods are replaced by light tubes.

Figure 10:
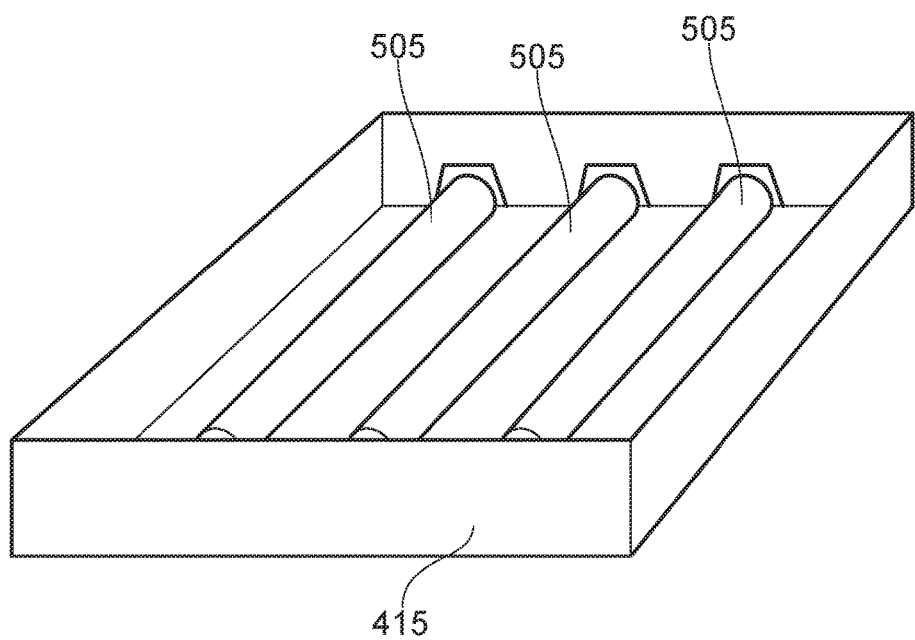
FIG. 10 shows an isometric view of a light box with an open box comprising fluorescent light tubes at that bottom.
Figure 11:
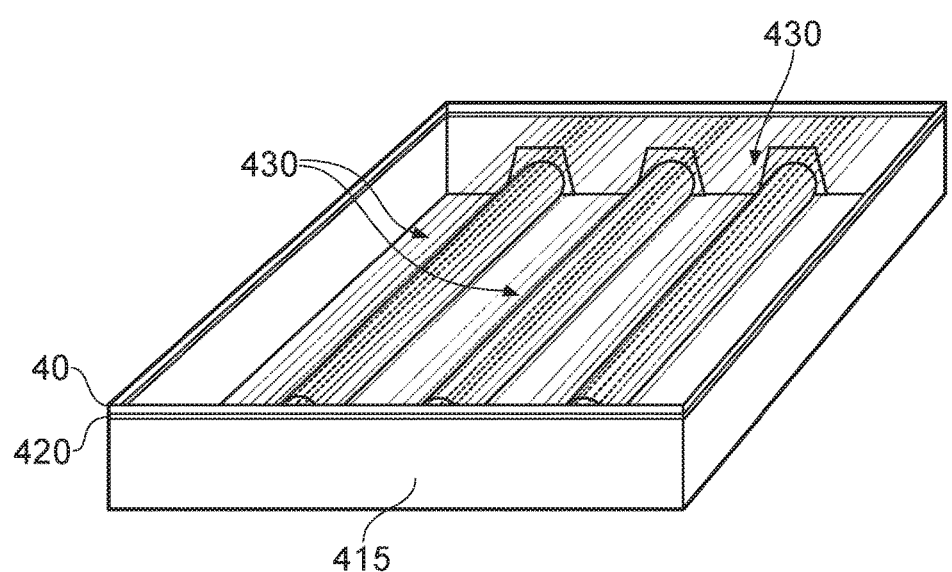
FIG. 11 shows an isometric view of the light box of FIG. 10 having the open top covered by a masked sheet and pane of a light panel.

In FIG. 11 the light box of FIG. 10 is shown covered by a masked sheet 420 and a pane 40 similar to the light box of FIG. 8. The masks 430 are shown as stripes on the masked sheet 420. The density of the shading of the masks is less near the edge of the stripe and greater near the middle of the stripe. A similar variation in density of the shading is present in FIGS. 1, 2, 4, 5, 7, and 8. The density is greater in interior area of the mask and the density is relatively less near the edge of the mask.

To prevent the light that passes through the mask from appearing yellow is accomplished by forming the mask with a coating of white ink that does not contain titanium or by adding ink tinted with small levels of cyan, magenta and black.

In one embodiment the ink comprises among other ingredients an optical brightener. An optical brightener absorbs light in the ultraviolet spectrum and re-emits the light in the blue spectrum. Advantageously the optical brightener compensates for the yellowing effect of a titanium based white ink. Typical optical brightening compounds are stilbenes, triazine-stilbenes (di-, tetra- or hexa-sulfonated), coumarins, imidazolinesm diazoles, triazoles, benzoxazolines, and biphenyl-stilbenes.

In one embodiment the ink comprises particles with a preselected particle size. Advantageously particles within a preselected particle size range prevent halos appearing on the panel due to interaction with the light transmitted through the ink. The "haloing effect" is summarized as: the bright areas that surround masked areas on a back lit tape when the masking uses an ink with mean particle sizes that are within the visible light range (390-700 nm).

Pigments are chosen for their ability to reflect light from selected parts of the visible electromagnetic spectrum, and thus produce coloured inks. Ink pigments are milled to small particle sizes and it is most economically viable to have an optimum mean particle size of 50-500 nm. Below this, the gain in light scattering efficiency with volume:weight ratio does not outweigh the energy cost of production. The opacity, colour, hue, tinting strength, gloss, durability and sample viscosity of pigments are all dependent upon the particle size.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

LIST OF INTEGERS

10 LED light
12 LED Strip
40 Pane of Light Panel
50 Side of Pane
60 Face of Pane
65 Face of Pane near edge of shade
70 Slot in Pane
200 Shade strip
210 Film of Shade
220 Mask of Shade near perimeter, primary mask near perimeter
221, 222 Stripes of white ink in shade
225, 226, 227 Secondary Masks of Shade
230 Faded edge of Mask, fringed perimeter of primary mask
240 Edge of shade nearest center of face
260 Shade sheet
270 Mask of Shade near central area, primary mask central area
280 Adhesive strip
300 Bright Area on Face of light emitting pane perimeter area
310 Dark Area on Face of light emitting pane perimeter area
320 Bright Area on Face of light emitting pane central area
330 Dark Area on Face of light emitting pane central area
405 Lighted Rod
410 LED lights in lighted rod
415 Perimeter wall of light box for light panel
420 Masked Sheet
425 Unmasked areas of masked sheet
430 Masked areas of masked sheet
440 Panel
460 Bottom of Light box
505 Fluorescent tube

The invention claimed is:

1. A shade to transmit uniform light emission from a light panel having bright and dark areas; the shade has the form of a tape roll-able into a roll which has regions of various preselected opacity spanning the length of the tape, characterized in that the opacity of the regions varies in register with the brightness of the areas; and the shade is roll-able into a roll of tape.

2. A shade according to claim 1 wherein the opacity of the regions is graduated to decrease in register with the brightness of the light pattern from a central portion of the regions to the edge of the regions.

3. A shade according to claim 1 wherein the film comprises a sheet wide enough to be marked with masks that shade bright areas extending from the edge of the face of the panel toward the center of the panel and that shade bright areas on the central area of the panel.

4. A shade according to claim 1 wherein the film has the shape of a strip of tape.

5. A shade according to claim 1 wherein the regions comprise a stripe of preselected opacity parallel to the lengthwise edge of the sheet or tape.

6. A shade according to claim 1 wherein a lengthwise edge of the sheet or tape has a shape form to follow a contour of a contiguous shaded region.

7. A shade according to claim 1 wherein the regions have a preselected white colour which varies in register with the brightness of the areas.

8. A shade according to claim 1 wherein portions of the regions are formed from ink that is at least 70% white ink, and up to 30% of a mixture of cyan ink, magenta ink and black ink so as to transmit white light from the areas.

9. A shade according to claim 8 wherein the ink comprises between 5% and 25% cyan ink and between 5% and 25% magenta ink and up to 6% black ink.

10. A shade according to claim 1 wherein the ink comprises titanium dioxide and an optical brightener which absorbs light in the ultraviolet spectrum and re-emits the light in the blue spectrum.

11. A shade according to claim 1 wherein the regions have a pre-selected opacity or colour which varies according to a mathematical function or a map defining the brightness of the areas.

12. A shade according to claim 1 wherein the film sheet or tape comprises a layer of adhesive so as to stick the film to the pane when brought into contact; wherein the adhesive has a preselected colour, transparency, or translucency to regulate the intensity and colour of light transmitted.

13. A shade according to claim 1 comprising a layer of adhesive which includes a strip of transparent adhesive between 0.5 millimeters and 2.0 millimeters wide arranged only along the length of a lengthwise edge of the film sheet or tape.

14. A light panel has a shade in the form of a film having regions of varying reflectivity and/or opacity so as to define a mask or a plurality of masks each dimensioned and arranged to lie in register with a light source located to shine through a light emitting pane of the panel so as to ensure regulated light emission from said panel, wherein the mask or masks are formed by a white ink tinted with between 5% and 25% cyan and between 5% and 25% magenta and up to 6% black ink according to a spectral rating of the light source.

15. A light panel according to claim 14 wherein the mask(s) is(/are) dimensioned and arranged so as to shade a pattern shone through the pane from the light source so that light radiates from said panel with uniform intensity.

16. A panel according to claim 14 wherein the shade has a shape with an edge to conform to an edge of a perimeter of a face of the light emitting pane.

17. A panel according to claim 14 wherein the shade is a band or tape.

18. A panel according to claim 14 wherein the shade has the form of a border to cover an area proximate the perimeter of the pane and ensure substantially uniform light transmission from said panel.

19. A panel according to claim 14 wherein the shade has a shape to cover substantially an entire face of the light emitting pane.

* * * * *